(12) United States Patent
Nolin

(10) Patent No.: US 7,975,824 B1
(45) Date of Patent: Jul. 12, 2011

(54) METHOD, APPARATUS AND SYSTEM FOR DISTRIBUTING DRY BULK FREE-FLOWING MATERIAL

(76) Inventor: Karl W. Nolin, Spencer, IA (US)

( * ) Notice: Subject to any disclaimer, the term of this patent is extended or adjusted under 35 U.S.C. 154(b) by 127 days.

(21) Appl. No.: 12/402,556

(22) Filed: Mar. 12, 2009

(51) Int. Cl.
*B21D 43/28* (2006.01)
(52) U.S. Cl. ...................................... 193/31 A; 406/183
(58) Field of Classification Search ............... 193/31 A; 406/182, 183; 137/119.01
See application file for complete search history.

(56) References Cited

U.S. PATENT DOCUMENTS

| | | | | |
|---|---|---|---|---|
| 437,735 A * | 10/1890 | Trapp | ................................. | 193/3 |
| 721,743 A * | 3/1903 | Richmond | ..................... | 406/182 |
| 876,687 A * | 1/1908 | Brown | .......................... | 137/874 |
| 1,354,747 A * | 10/1920 | Hiller | ............................. | 193/31 A |
| 2,436,624 A * | 2/1948 | Volk | ................................... | 193/23 |
| 2,605,076 A * | 7/1952 | Tanke | .......................... | 193/31 R |
| 2,673,126 A * | 3/1954 | Matthews | ..................... | 406/183 |
| 2,729,547 A * | 1/1956 | Alleman | ........................ | 422/206 |
| 3,489,178 A * | 1/1970 | Kice | ................................. | 406/183 |
| 3,731,796 A * | 5/1973 | Smith | ............................ | 209/568 |
| 3,774,863 A * | 11/1973 | Ekama | ............................ | 406/183 |
| 3,794,359 A * | 2/1974 | Fisher | ............................. | 285/55 |
| 4,024,939 A * | 5/1977 | Grieshop et al. | ................... | 193/5 |
| 4,122,932 A * | 10/1978 | Neubert et al. | .................... | 193/5 |
| 4,246,739 A * | 1/1981 | Rogerson | ........................ | 53/438 |
| 4,264,238 A * | 4/1981 | Leckband et al. | .............. | 406/62 |
| 4,671,740 A * | 6/1987 | Ormiston et al. | .......... | 416/241 B |
| 4,684,155 A * | 8/1987 | Davis | ............................... | 285/16 |
| 4,697,686 A * | 10/1987 | West | ................................ | 193/23 |
| 4,836,250 A * | 6/1989 | Krambrock | ............... | 137/625.47 |
| 5,090,544 A * | 2/1992 | Carroll | ........................ | 193/31 A |
| 5,228,577 A * | 7/1993 | Wilson | .......................... | 209/702 |
| 5,277,292 A * | 1/1994 | Boxall | ........................... | 194/346 |
| 5,741,094 A * | 4/1998 | Heep | .............................. | 406/182 |
| 5,887,698 A * | 3/1999 | Soldavini | ..................... | 198/360 |
| 6,220,793 B1 * | 4/2001 | Meyer | ........................... | 406/183 |
| 6,365,858 B1 * | 4/2002 | Vicktorius et al. | ............ | 209/567 |
| 7,534,074 B2 * | 5/2009 | Kato | .............................. | 406/183 |

OTHER PUBLICATIONS

Applicant Admitted Prior Art—Abresist, The Wear Protection People, promotional literature entitled "Abrasion Resistant Pipes for Pneumatic and Hydraulic Systems".
Applicant Admitted Prior Art—Abresist, The Wear Protection People, promotional literature entitled "Abrasion Resistant Linings for Production and Conveying Systems".

\* cited by examiner

*Primary Examiner* — Joe Dillion, Jr.
(74) *Attorney, Agent, or Firm* — Simmons Perrine Moyer Bergman PLC

(57) ABSTRACT

A system and method for changing a flow direction of dry bulk material which comprises constructing a steel clad ceramic elbow or pipe or planar flip gate and placing the same in a location where a flow direction change is desired and where abrasion will occur. The inside of the pipe has a steel surface, as does the exterior of the pipe. The ceramic material is disposed in the gap between the steel exterior and interior. The interior steel pipe wears away in portions but the remaining non-worn away portion still provides valuable support for the uncovered ceramic portions.

6 Claims, 9 Drawing Sheets

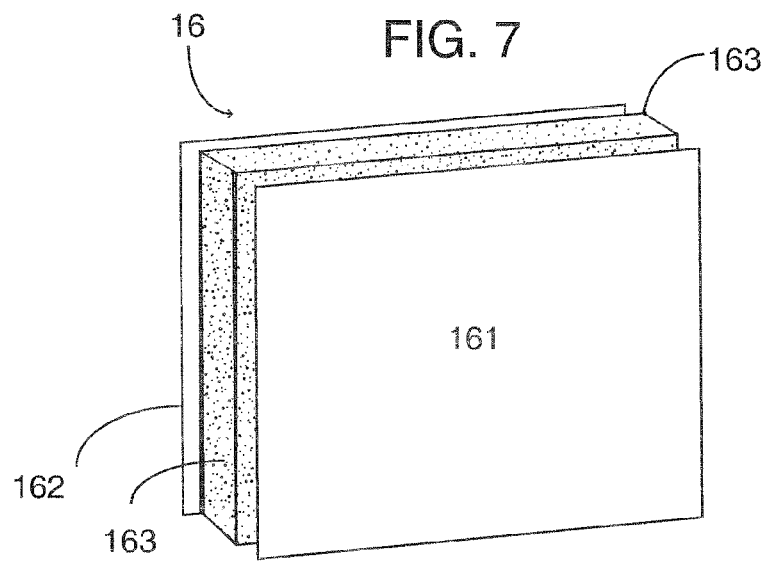
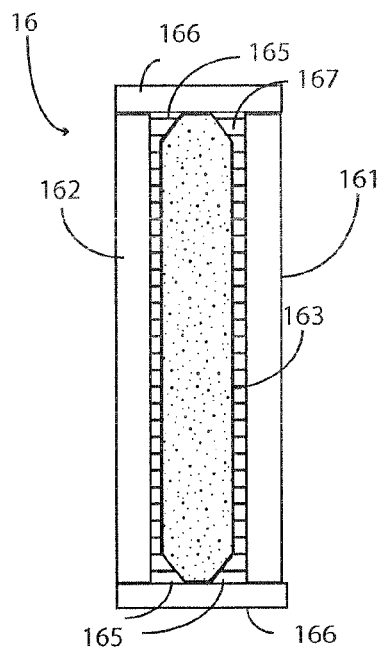
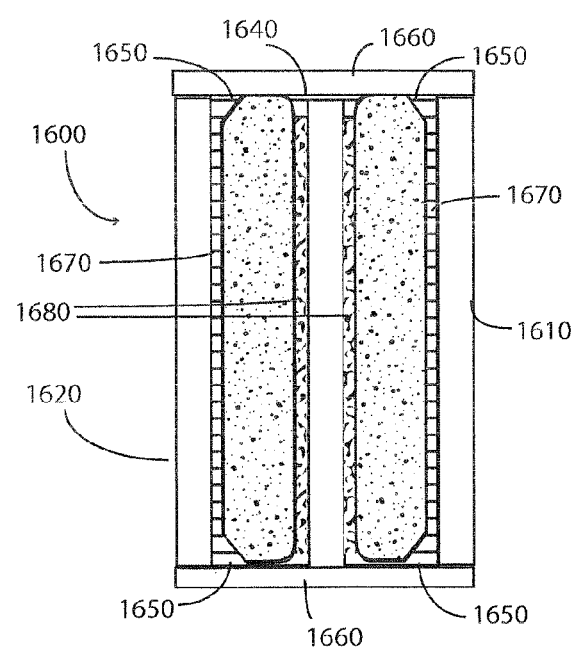

METHOD, APPARATUS AND SYSTEM FOR DISTRIBUTING DRY BULK FREE-FLOWING MATERIAL

FIELD OF THE INVENTION

The present invention generally relates to grain and dry bulk material handling, and more particularly relates to changing the direction of and diverting the flow of dry bulk material, and even more particularly relates to methods and systems for extending the service life of elbows, valves and diverters for flowing dry bulk material.

BACKGROUND OF THE INVENTION

In recent years, certain industries have dramatically increased the amount of grain necessary to meet their operations. For example, ethanol plants utilize a large amount of grain and have grain distribution systems which often handle a higher grain throughput than does a typical grain storage elevator. It also has become increasingly important for such business to remain efficient in their operations and to minimize the duration of any downtime.

In the past, grain handling equipment manufacturers have sold ceramic-lined spouts, elbows, and even "Y" valve ceramic-lined directional flow diverters for applications that have very high flow rates. These ceramic-lined systems typically involve gluing or otherwise adhering ceramic tiles to the inside surface of spouts, valves, and diverters, etc. The ceramics tiles are well known to handle abrasion better than grain handling apparatus with a metal-to-grain contact surface. While these ceramic-lined spouts, elbows, and diverters, etc. have enjoyed much success and have been used extensively in the past, they do have some drawbacks.

First of all, often non-grain debris which is harder and heavier than grain becomes mixed with the grain; e.g., rocks, metal pieces, screws, nuts, bolts, etc. can find their way into the grain. When this happens, damage to the tiles can be substantial. Impact of a large enough object at a high enough velocity can result in breaking off parts of the ceramic tiles, which may cause still more damage further down the material flow path. It has also been proposed to use a ceramic tile itself as a diverter in a material flow path. In such cases, it is possible for the ceramic tile to break and/or become displaced from its working arrangements, resulting in rapid changes with substantial leakage of material into unwanted pathways.

Consequently, there exists a need for improved methods and systems for providing, maintaining, repairing and replacing equipment for diverting dry bulk material in an efficient manner.

SUMMARY OF THE INVENTION

It is an object of the present invention to provide a system and method for diverting dry bulk material in an efficient manner.

It is a feature of the present invention to utilize a ceramic filled flow-diverting structure.

It is a feature of the present invention to utilize material other than ceramic, which also possess superior abrasion-resistance properties, such as urethane and ceramic chip urethane.

It is an advantage of the present invention to increase the service life of flow-diverting panels in "Y" style valves.

It is another feature of the present invention to provide for a replaceable ceramic filled flow direction changing panel.

It is another feature of the present invention to utilize a panel with a single slab of abrasion-resistant material, as well as multiple smaller tiles in combination.

It is another advantage of the present invention to reduce the time to replace a failed ceramic flow-diverting panel.

The present invention is an apparatus and method for diverting large quantities of flowing dry bulk material in an efficient manner, which are designed to satisfy the aforementioned needs, provide the previously stated objects, include the above-listed features, and achieve the already articulated advantages. The present invention is carried out in a "displaced diverter tile-less" manner in a sense that tendency for an abrasion-resistant diverter tile to break and then become displaced from its operating configuration, has been greatly reduced.

Accordingly, the present invention is a system and method including a ceramic or other abrasion-resistant material filled flow-diverting panel.

BRIEF DESCRIPTION OF THE DRAWINGS

The invention may be more fully understood by reading the following description of the preferred embodiments of the invention, in conjunction with the appended drawings wherein:

FIG. 7 is a perspective view of the diversion panel 16 of FIGS. 1-5.

FIG. 8 is a cross-sectional view of the diversion panel 16 of FIG. 7 taken on line 8-8.

FIG. 9 is a cross-sectional view of an alternate embodiment of the present invention showing abrasion-resistant material inside a metal housing.

DETAILED DESCRIPTION

Figure 1:
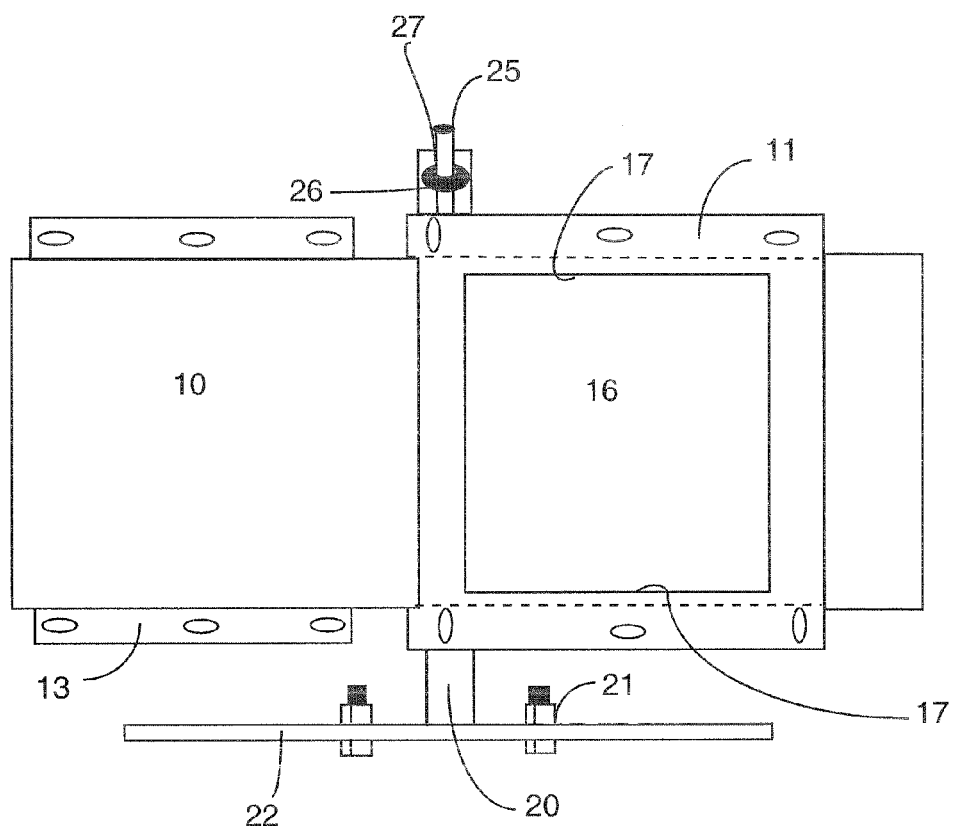
FIG. 1 is a top view of a valve embodying the invention.
Figure 2:
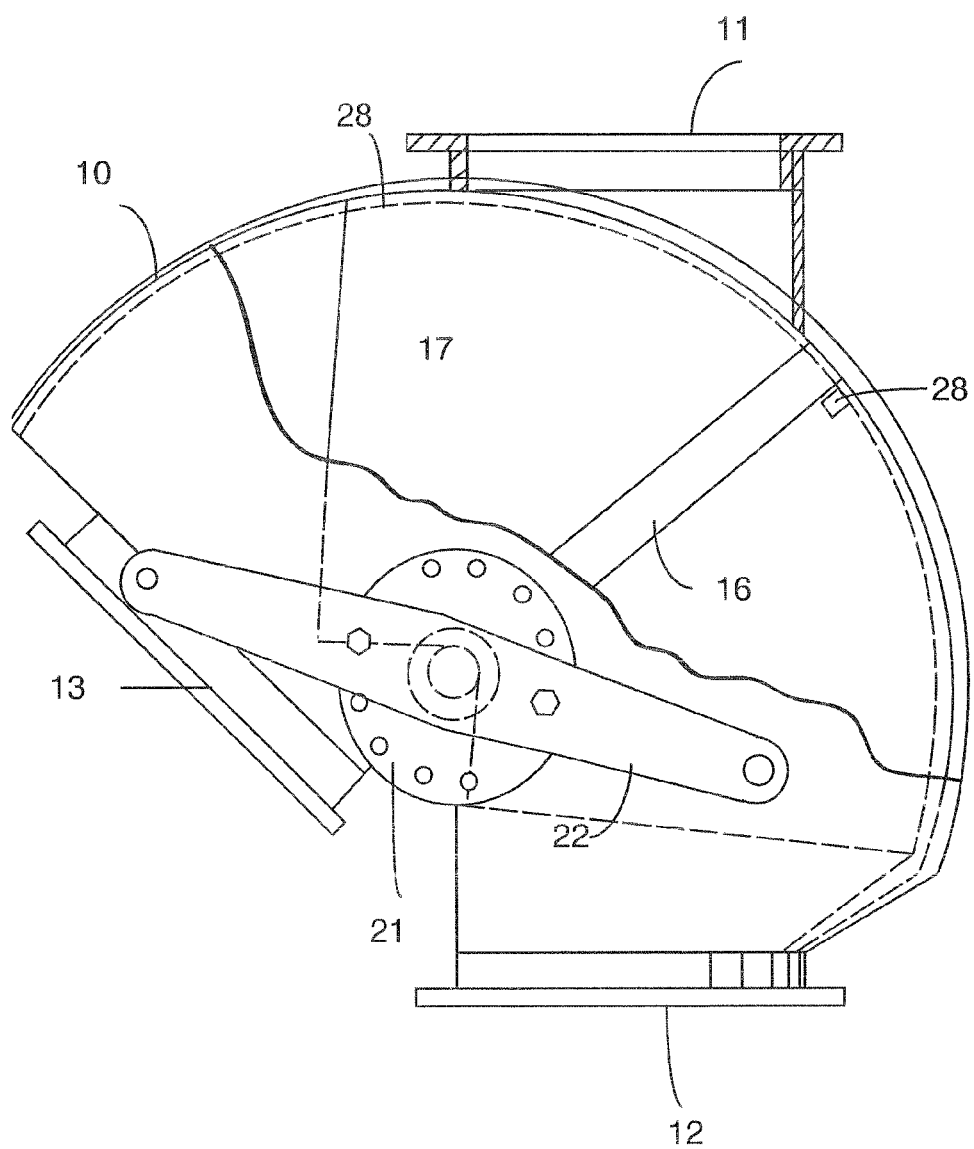
FIG. 2 is a side elevational view of the valve in FIG. 1.
Figure 3:
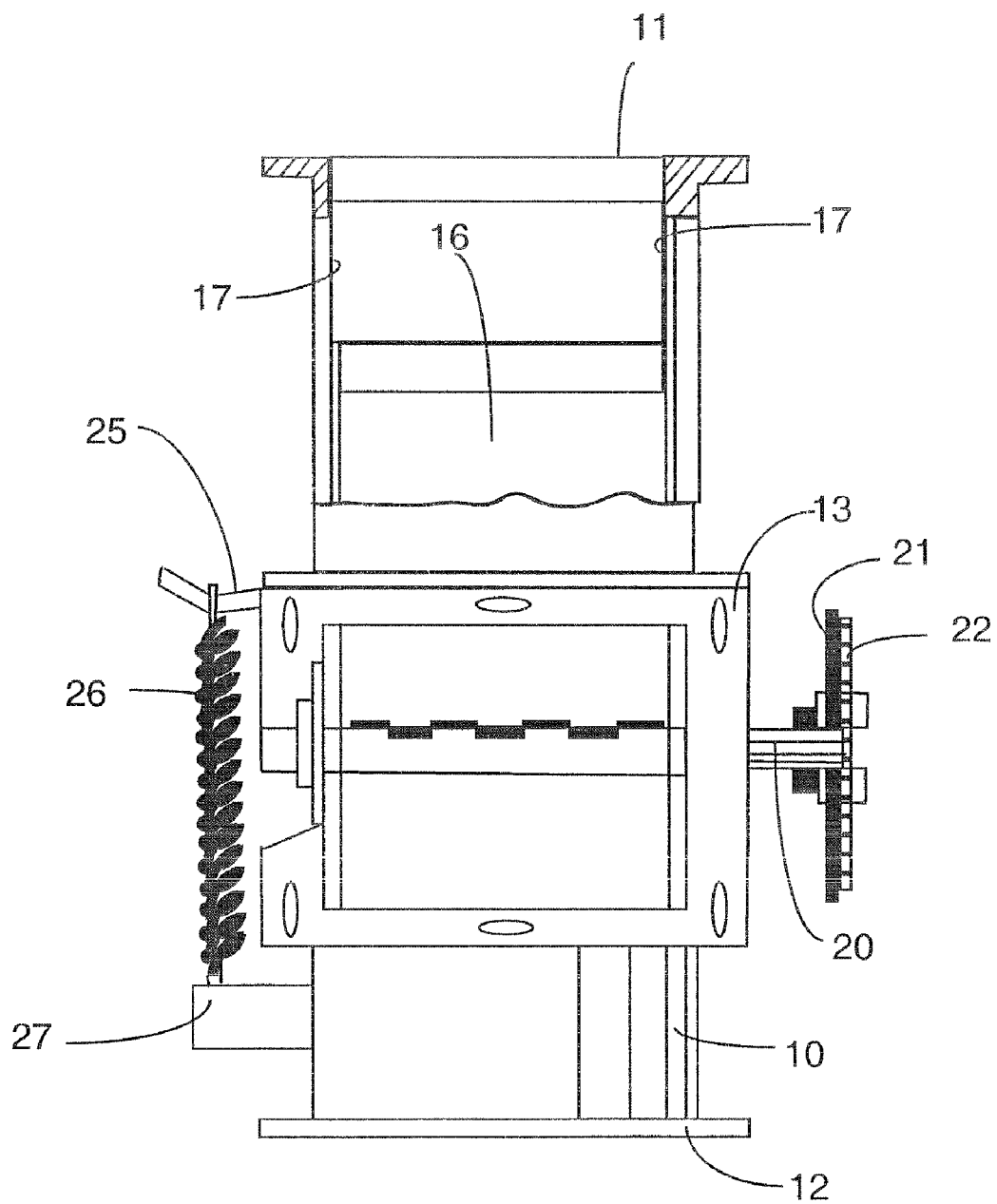
FIG. 3 is an edge elevational view of the valve of FIGS. 1 and 2 with a portion of the housing broken away along line 3-3 of FIG. 2.
Figure 4:
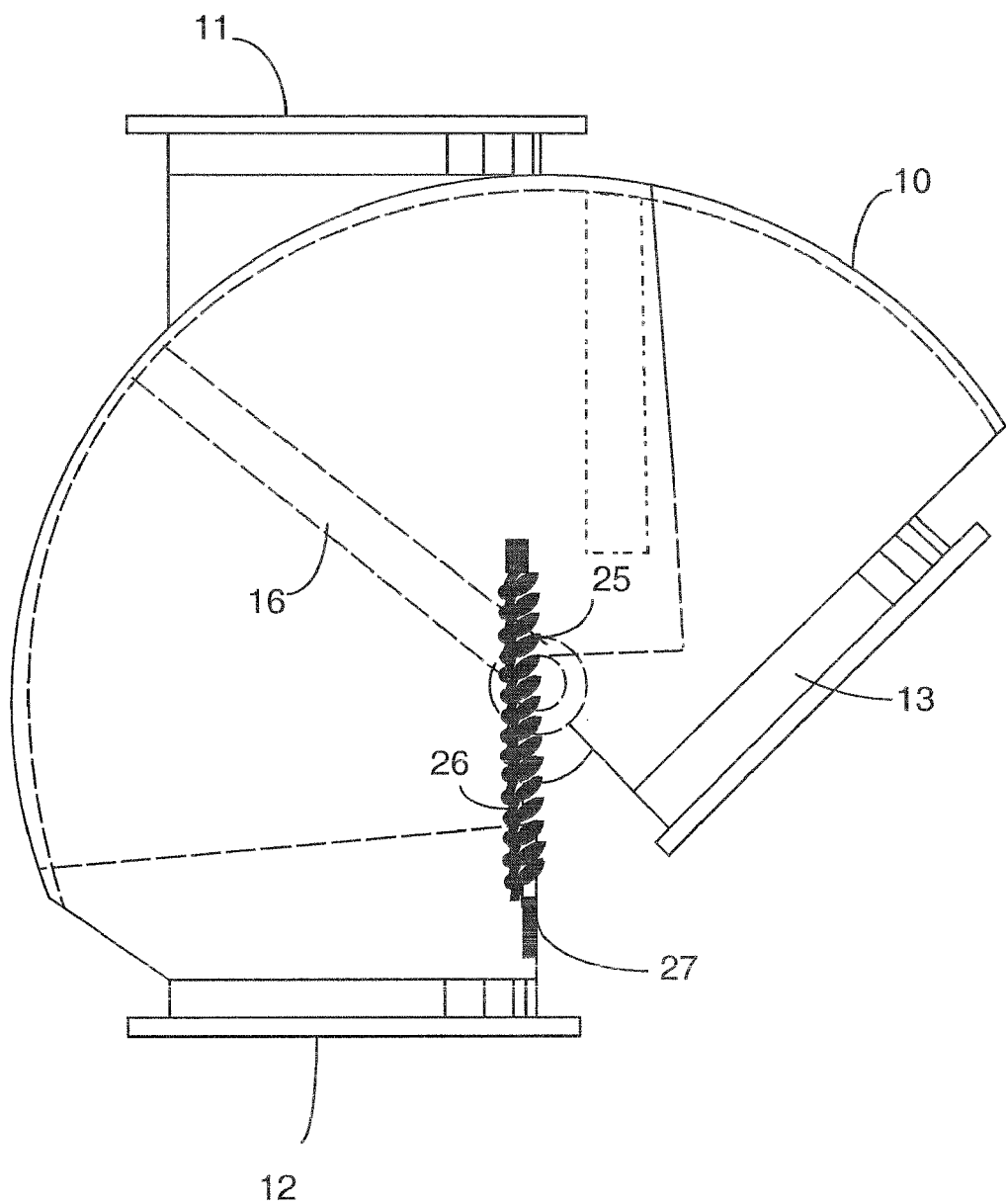
FIG. 4 is a side elevational view of the valve from the side opposite in FIG. 2 and showing the spring holding device for the valve member.

Briefly, my invention comprises a valve for controlling the flow of grain into selected chutes. The valve is designed with a valve operating member to enclose the flow so that the grain cannot be caught between the valve member and the side walls of the valve housing.

Now referring to the drawings wherein like numerals refer to like matter throughout, and more specifically referring to the drawings of the first embodiment (FIGS. 1-5), I illustrate a valve body 10 having an inlet 11 into which the grain will flow. A principal outlet 12 is approximately in line vertically with the inlet 11. A secondary outlet 13 into which grain may be directed extends at an angle away from the vertical. Thus, grain may come into the housing 10 from above through the inlet 11 and be directed into either outlet by a valve member.

Figure 5:
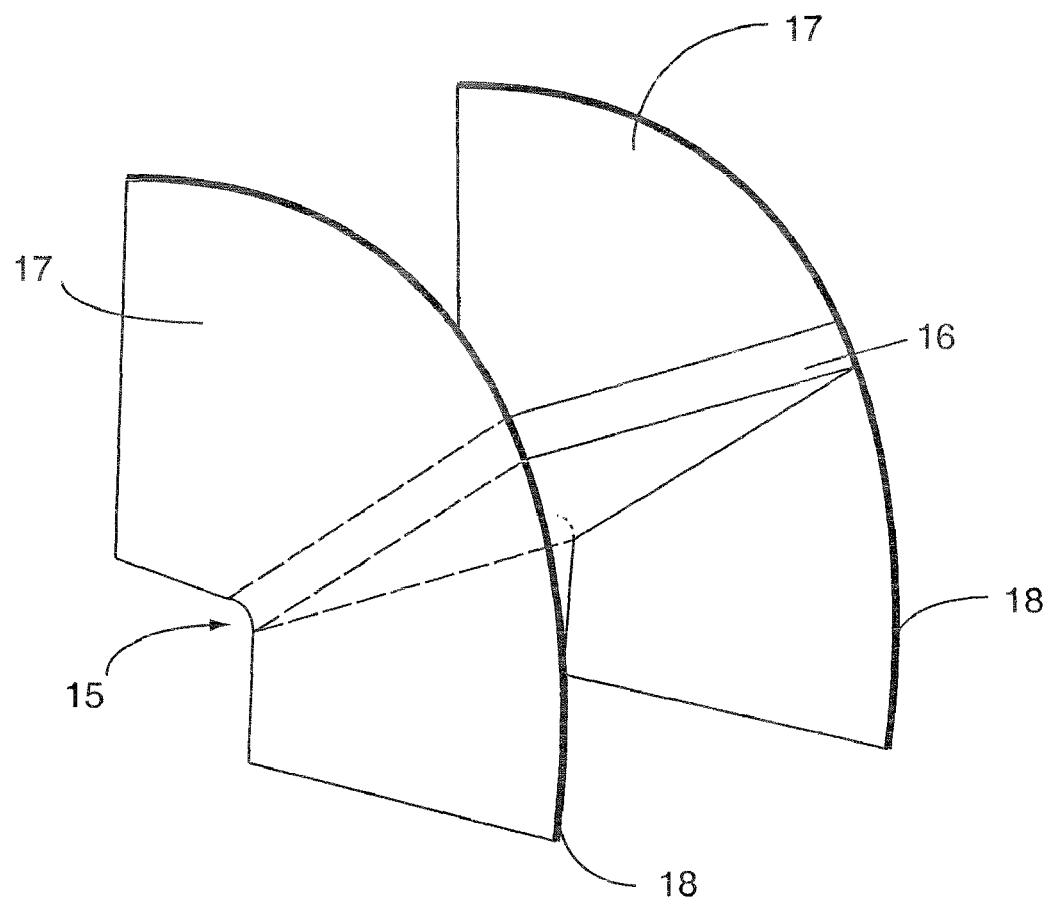
FIG. 5 is a perspective view of the valve member used in the valve shown in FIGS. 1-4.

Customarily, the valve member has been a simple plate which might have been rimmed with a flexible material such as belting. In my improved device, I use a valve member 15 as shown in FIG. 5. A diversion panel 16 is retained, but side plates 17 are provided on each lateral edge of the panel 16. These side plates 17 are formed with an arcuate outer edge 18 adapted to fit into the housing 10 as is apparent in FIG. 2. It may be noted that the side walls of the housing 10 are also found in arcuate form. It might also be noted that no internal spout is necessary. The inlet 11 is simply an extension of the entry pipe (not shown).

The member 15 is mounted on a shaft 20 journalled in the side walls of the housing 10. Various means of turning the valve may be provided. The simplest is illustrated. It consists of a plate 21 fixed to the shaft 20. A cross beam 22 is fastened to the plate. Chains or ropes or the like may be fastened to each end of the cross beam 22, and these can be pulled selectively to control the position of the valve member 15 within the housing 10. It will be obvious that chains and sprocket devices or power operated devices such as geared motors may be substituted for the pull-type device.

Means for holding the valve member 15 in position is also provided. This consists of a lever 25 fastened to the axle 20 at its end opposite the plate 21. A spring 26 extends between the free end of that lever 25 and a tab 27 fixed to the housing 10. The positions of the tab 27 and lever 25 are arranged so that the free end of the lever pulls the spring 26 over the center as the valve member 15 moves from one position to its alternate position. Thus, the spring will tend to pull the valve member into either position and will be stretched longer between those positions.

In order to hold the panel 16 in position, stops 28 in the form of metal strips fastened to the upper wall of the housing 10 in position to be engaged by the plate.

The use of the device will be obvious from the description thus far. The principal benefit comes from the unique side walls 17. These walls are proportioned so that in either position of the valve member, they completely cover the walls of the housing 10. Thus, the grain is completely enclosed in a trough formed by the panel 16 and the sidewalls 17 as it enters the housing 10 through the entry 11 and is directed through either outlet 12 or 13. Therefore, the grain cannot be leaked between the panel 16 and the walls of the housing 10. This greatly eliminates leakage of the grain. The side walls are substantially co-extensive with the sides of the housing 10 to avoid leakage. The moving part is also blocked by the strips 28 and can be held positively in place so that the force of the grain does not tend to move the valve member in any direction.

Figure 6:
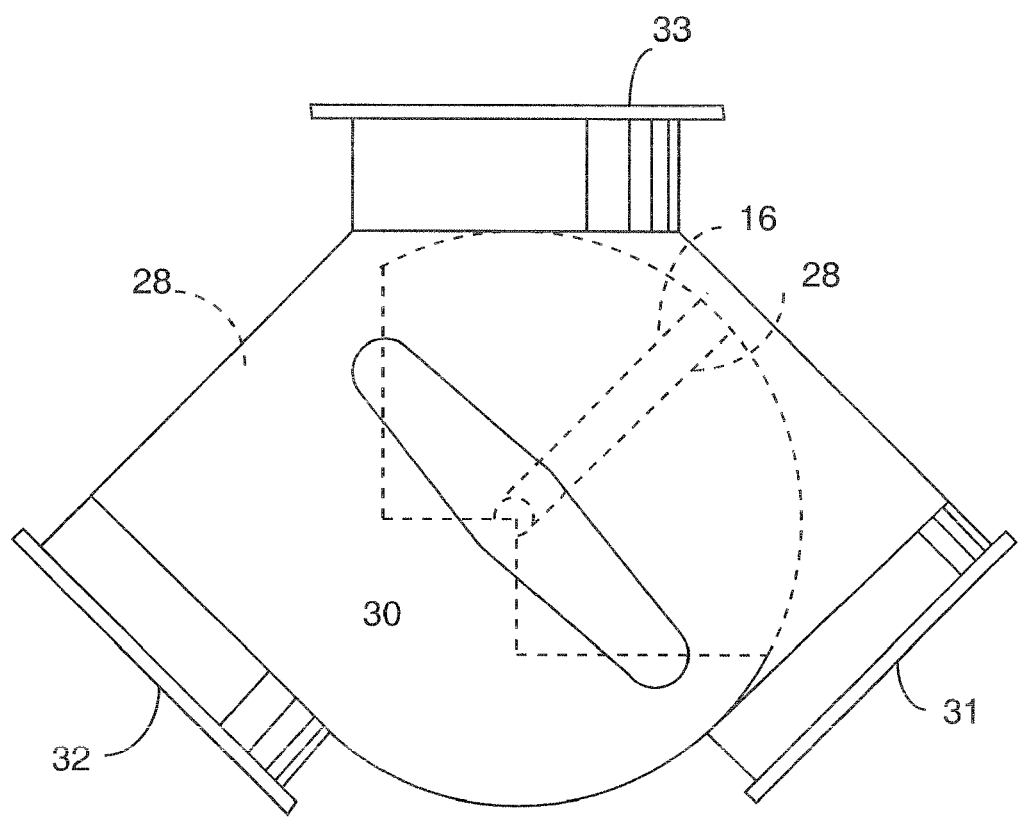
FIG. 6 is a side elevational view of another type of two-way valve housing in which the core filled member may be embodied.

A simple alternate is shown in FIG. 6. Here the outlets 31 and 32 of the housing 30 are both directed at an angle from the vertical. The inlet 33 is still adapted to receive the grain vertically. The same type of valve member 15 may be used in the housing 30 with the same beneficial results.

It should be understood that ceramic is used as an example of a tile, but other abrasion-resistant materials could be used as well, such as urethane. Ceramic should be viewed here as being merely an example of many different suitable materials.

Now referring to FIG. 7, there is shown an exploded perspective view of a diversion panel 16 having a first outer surface 161 and central abrasion-resistance central core 163, which may be ceramic and a second outer surface 162. One type of ceramic that is used is a custom designed 90% alpha alumina oxide ceramic sold under the trade name of Durafrax 2000 by Saint-Gobain, Tour Les Miroirs, 18, avenue d'Alsace 92 096 La Défense cedex France.

The outer surfaces often may be metallic, but it should be understood that while metallic surfaces are mentioned as examples, many other suitable materials could be substituted, such as aluminum, steel, cast iron, concrete, PVC, etc.

Now referring to FIG. 8, there is shown a cross-sectional view of the diversion panel 16. It shows beveled edges 165 at the top and bottom of the ceramic 163, which may (but need not) be included to facilitate insertion of the ceramic 163 into a prefabricated gap between the outer metal sheets 161 and 162. In one method, the ceramic 163 is inserted into the gap and then liquid urethane 167, or other suitable substitute, is poured around the ceramic tile 163 and allowed to cure and then covered by end cap plates 166. In another embodiment, the ceramic tile is attached to a steel support plate with epoxy or other suitable adhesive. The steel support plate is then welded in place and capped. An alternative could be that the steel support plate and affixed ceramic could be one side of the diversion panel 16.

Numerous variations of the disclosed ceramic-filled diversion panel 16 could be used as well. For example, now referring to FIG. 9, there is shown a ceramic insert which has a metal core 1640 with ceramic tiles 1650 adhered on both sides via epoxy 1680 or the like. This metal core ceramic insert is then put between the outer panels 1610 and 1620 and the space filled with liquid urethane 1670 just as the ceramic tile 163 is put between outer surfaces 161 and 162 in FIG. 8. The benefit provided by the variation shown in FIG. 9 is that if both of the outer surfaces 1610 and 1620 are worn through so that flowing material is contacting the ceramic on both sides, the metal core 1640 helps hold the ceramic in place and prevents a hole completely through the diversion panel 16 if a heavy metal object were to strike the ceramic; i.e., the ceramic 1650 with the interior metal core is more likely to stay in place despite severe cracking than would a single homogenous ceramic tile. Plates 1660 hold the ceramic insert in place.

Figure 10:
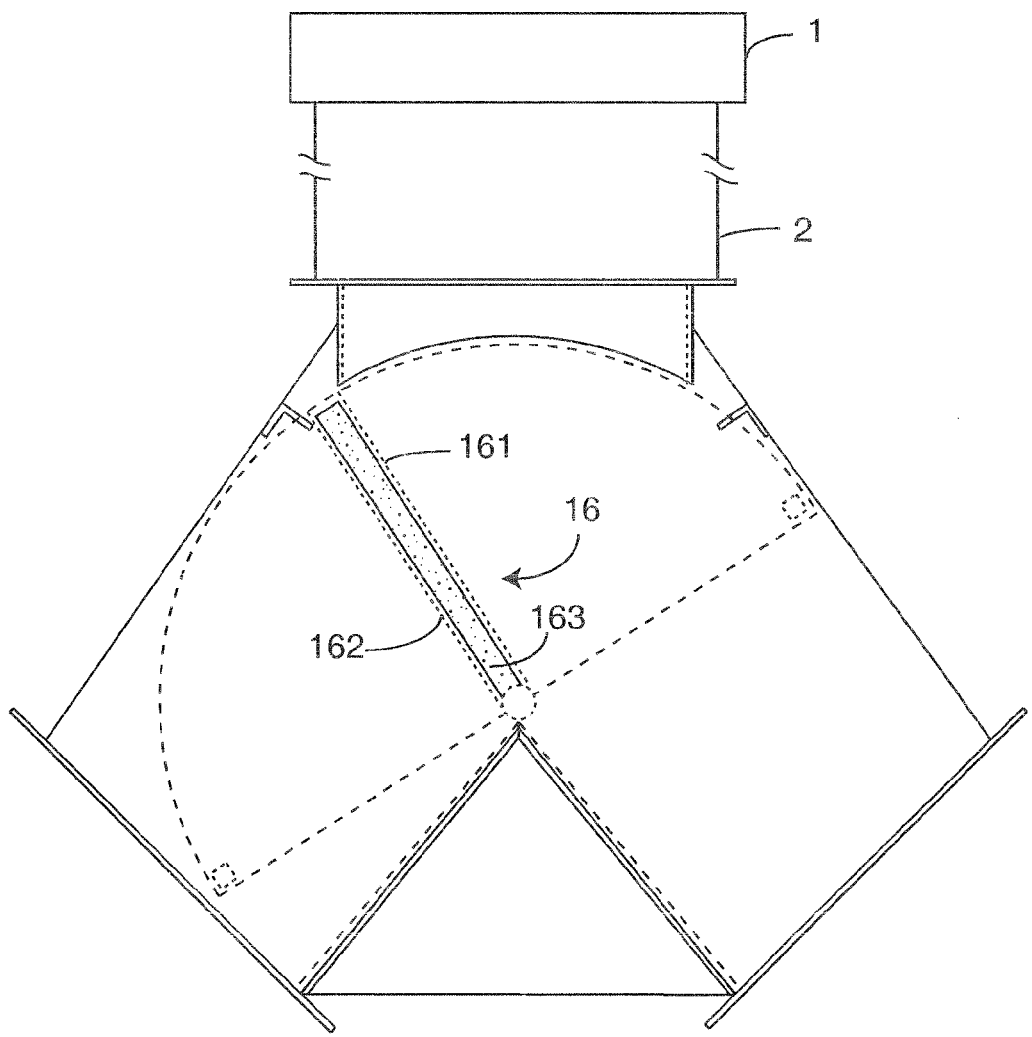
FIG. 10 is an enlarged view of a Y valve of the present invention.

Now referring to FIG. 10, there is shown another view of a Y valve of the present invention with a double-walled structure with a ceramic-filled core with an input pipe 1 and an input adapter 2

Figure 11:
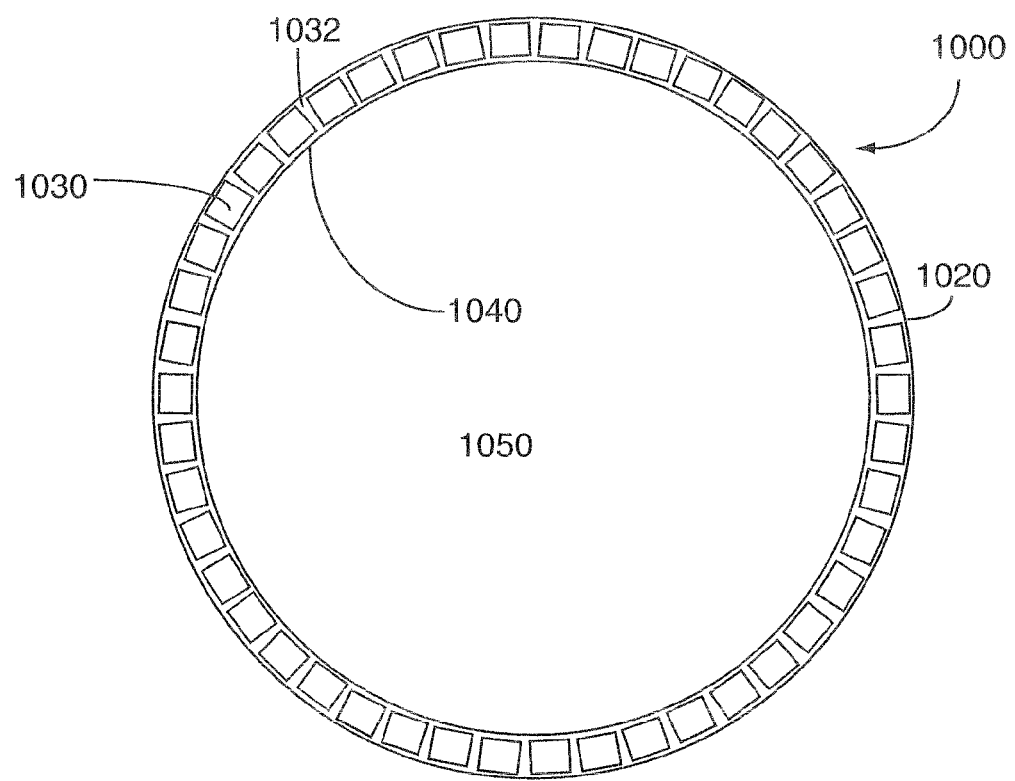
FIG. 11 is a cross-sectional view of a co-axial double-walled spout or elbow of the present invention showing a ceramic-filled core.

Now referring to FIG. 11, there is shown a cross-sectional view of another embodiment of the present invention which shows a double-walled spout or elbow 1000 with an exterior wall 1020 and an interior wall 1040 disposed adjacent to the cavity 1050 for containing flowing bulk material. Disposed between the walls 1020 and 1040 is a ceramic filling which may be a single piece of ceramic pipe or a plurality of ceramic tiles 1030 affixed to either of the walls 1020 or 1040 or affixed to both of the walls via a urethane binder 1032 as discussed above. FIG. 11 should be understood to be a view of a curved section of a spout; e.g., an elbow (where abrasion is often more of a problem), as well as a straight section of a double-walled ceramic-filled spout. Some of the descriptions and teachings relating to FIGS. 7-9 are equally applicable to double-walled pipes and elbows with ceramic cores, and it is believed that a person skilled in the art could readily create such a double-walled ceramic-filled elbow.

Throughout this description, it has been focused upon the flow diversion panel of a Y valve. However, this is merely one example of a flow diversion panel or structure of the present invention. Indeed, the flow-diverting structures of the present invention could be ceramic-filled spouts, elbows, etc. A key distinction of the present invention is that the prior art ceramic spouts, elbows, valves, etc. have been ceramic lined, meaning a ceramic layer is disposed on the side of the spout adjacent to the flowing bulk material. The present invention brings forth the notion of a ceramic-filled structure where the ceramic material is disposed in a space between substantially parallel structures, such as parallel plates, co-axial tubes and elbows. The ceramic thereby forms at least part of a core between these parallel and/or co-axial structures. As discussed above, the ceramic tiles can be held in place with epoxy or with a liquid urethane. A benefit of this structure is the increased ability to retain ceramic material in the desired location even after it has been cracked. Consequently, it is preferred that the material used in the present invention for the outer walls, i.e. the material containing the ceramic core, have a lower propensity to crack as compared to the ceramic material.

Throughout this description, reference is made to grain, grain handling, grain elevators, grain bins and to feed and feed mills, because it is believed that the beneficial aspects of the present invention would be most readily apparent when used in connection with grain and feed; however, it should be understood that the present invention is not intended to be limited to grain and feed handling and should be hereby construed to include other agricultural and non-agricultural applications as well. For example only, and not intended as a limitation, the dry bulk material may be corn, soybeans, wheat, rice, almonds, walnuts, peas, coffee beans, paint pigment, or any free-flowing dry bulk material, such as coal. The term "dry bulk material" is intended to refer to the above-listed materials and other materials having similar properties.

Additionally, the present invention is described as having a ceramic inner core in a diverter panel. It should be understood that materials other than ceramic could be substituted so long as they have superior resistance to abrasion from the intended and reasonably expected unwanted dry bulk material, such as urethane, ceramic chip urethane. Also the material may be arranged in multiple tiles, on single slab or other configurations, depending upon the particular application.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

I claim:

1. A system for changing a flow direction of flowing grain from a first direction to at least one second direction comprising:
    an inlet oriented in said first direction;
    a flow of grain through said inlet;
    at least one outlet oriented in a second direction;
    a double-walled flow-diverting structure further comprising a core of material having a core abrasion-resistance characteristic which has more resistance to abrasion than the wall abrasion-resistance characteristic of walls of said double-walled flow-diverting structure;
    wherein said core is stationary in operation and configured for adjustability and comprises a substantially planar stack of a plurality of parallel layers of a first material with a substantially planar layer of second material disposed therebetween each pair of said plurality of parallel layers, wherein said second material has a higher resistance to abrasion caused by contact with flowing grain; and
    wherein said second material has a higher propensity to crack than does said first material when said flow impacts said double-walled flow-diverting structure.

2. A system of claim 1 wherein said core is ceramic material and said flow of grain is corn.

3. A system of claim 1 wherein said doubled-walled flow-diverting structure comprises a substantially planar stack of a plurality of parallel layers of steel with a substantially planar and layer of ceramic material disposed therebetween.

4. A system of claim 3 further comprising a urethane binder disposed between said ceramic material and each of said plurality of parallel layers of steel.

5. A system of claim 1 wherein said first material is steel and said second material is alumina ceramic.

6. A system of claim 5 further comprising a urethane binder coupling said alumina ceramic with said steel.

* * * * *